United States Patent
Russell et al.

(10) Patent No.: US 10,560,181 B2
(45) Date of Patent: Feb. 11, 2020

(54) AERIAL VEHICLE MANAGEMENT FOR AN AERONAUTICAL COMMUNICATIONS NETWORK

(71) Applicant: AERONET GLOBAL COMMUNICATIONS LABS DAC, Dublin (IE)

(72) Inventors: Brian Russell, Dublin (IE); Ronan Farrell, Dublin (IE)

(73) Assignee: AERONET GLOBAL COMMUNICATIONS LABS DAC, Dublin (IE)

( * ) Notice: Subject to any disclaimer, the term of this patent is extended or adjusted under 35 U.S.C. 154(b) by 0 days.

(21) Appl. No.: 16/077,464

(22) PCT Filed: Feb. 13, 2017

(86) PCT No.: PCT/EP2017/053172
§ 371 (c)(1),
(2) Date: Aug. 11, 2018

(87) PCT Pub. No.: WO2017/137630
PCT Pub. Date: Aug. 17, 2017

(65) Prior Publication Data
US 2019/0052349 A1 Feb. 14, 2019

Related U.S. Application Data

(60) Provisional application No. 62/294,549, filed on Feb. 12, 2016.

(30) Foreign Application Priority Data

Feb. 19, 2016 (EP) .................................. 16156610

(51) Int. Cl.
*H04W 4/00* (2018.01)
*H04B 7/185* (2006.01)
(Continued)

(52) U.S. Cl.
CPC ....... *H04B 7/18504* (2013.01); *G08G 5/0039* (2013.01); *H04B 7/18506* (2013.01); *H04W 4/46* (2018.02); *H04W 16/18* (2013.01)

(58) Field of Classification Search
CPC .. G08G 5/0008; G08G 5/0013; G08G 5/0069; H04Q 3/0091
(Continued)

(56) References Cited

U.S. PATENT DOCUMENTS

| 7,072,977 B1 | 7/2006 | Bernard et al. |
| 2010/0142445 A1* | 6/2010 | Schlicht ................. H04W 4/20 370/328 |

(Continued)

OTHER PUBLICATIONS

PCT/EP2017/053172. International Search Report & Written Opinion (dated May 22, 2017).

*Primary Examiner* — Tu X Nguyen
(74) *Attorney, Agent, or Firm* — Loza & Loza, LLP; Anthony G. Smyth

(57) ABSTRACT

The invention provides a system and method of providing service coverage for the provision of data services to a target aircraft comprising the step of configuring one or more other aircraft in an area at a specific time such that the data services can be provided via a radio or communication link to the target aircraft via the one or more other aircraft; and predicting a data services requirement in an area and configuring a pattern of communication links with the one or more other aircraft and the target aircraft to maintain the predicted data services.

15 Claims, 6 Drawing Sheets

(51) Int. Cl.
*H04W 4/46* (2018.01)
*G08G 5/00* (2006.01)
*H04W 16/18* (2009.01)

(58) Field of Classification Search
USPC ............... 455/431, 321.1, 432, 3, 430, 436
See application file for complete search history.

(56) References Cited

U.S. PATENT DOCUMENTS

| | | | |
|---|---|---|---|
| 2014/0114606 A1* | 4/2014 | Herriot | H04W 16/18 702/150 |
| 2015/0236778 A1 | 8/2015 | Jalali | |
| 2015/0350457 A1 | 12/2015 | Lauer | |
| 2016/0028471 A1 | 1/2016 | Boss et al. | |

\* cited by examiner

AERIAL VEHICLE MANAGEMENT FOR AN AERONAUTICAL COMMUNICATIONS NETWORK

CROSS-REFERENCE TO RELATED APPLICATIUONS

This application is the U.S. National Stage of International Patent Application No. PCT/EP2017/053172 filed on Feb. 13, 2017, which claims the benefit of priority from EP Patent Application No. 16156610.4 filed Feb. 19, 2016 and U.S. Provisional Patent Application No. 62/294,549 filed Feb. 12, 2016, the disclosures of the foregoing applications being incorporated herein by reference in their entirety for all applicable purposes.

FIELD

The invention relates to an aerial vehicle management system and method for an aeronautical communications network.

BACKGROUND

It is desirable to provide a network of multiple aerial vehicles and ground stations through which an aerial vehicle will be able to receive data services through a radio link either directly from that aircraft to a ground station or via links to other aircraft from which a connection will be made to a ground station. Maintaining communication links is a complicated task with present systems providing poor connectivity or no connectivity to users on an airborne or moving vehicle.

U.S. Pat. No. 7,072,977, assigned to Codem Systems Inc, discloses a High bandwidth network access is extended to vehicles and passengers on vehicles. The network is extended to a vehicle by way of one or more intermediate nodes, which may be other vehicles or signal relays. In order to acquire the vehicles to which to extend the network, route data is provided to the intermediate nodes and to the vehicles. Computers on-board the vehicles and intermediate nodes determine which pairs of vehicles and intermediate nodes should establish links to form a network based on the route data and link scoring. The vehicles and intermediate nodes then control directional antennas to point at each other based on the route data and the scoring to establish the links. However a problem with the Codem system is that it does not effectively or dynamically manage datalinks on a target aircraft when moving through a particular region. The Codem system describes routing calculation steps to figure out all possible link LOS then add link quality sorting before directing antenna pointing, but the link quality sorting does not address the bandwidth being demanded. Moreover the problem is compounded by moving aircraft where the bandwidth requirement can fluctuate greatly during a flight time.

It is an object to provide an improved system and method for enabling and maintaining communication links with one or more airborne vehicles.

SUMMARY

According to the invention there is provided, as set out in the appended claims, a method of providing service coverage for the provision of data services to a target aircraft comprising the step of configuring one or more other aircraft in an area at a specific time such that the data services can be provided via a radio or communication link to the target aircraft via the one or more other aircraft.

In one embodiment there is provided the step of sharing bandwidth from the one or more other aircraft, obtained from a terrestrial or satellite link, with said target aircraft via an aircraft to aircraft link.

In one embodiment there is provided the step of predicting data services requirement in an area and configuring a pattern of communication links with the one or more other aircraft and the target aircraft to maintain the data services.

In one embodiment there is provided method of providing service coverage for the provision of data services to a target aircraft comprising the steps of:
configuring one or more other aircraft in an area at a specific time such that the data services can be provided via a radio or communication link to the target aircraft via the one or more other aircraft; and
predicting a data services requirement in the area and configuring a pattern of communication links with the one or more other aircraft and the target aircraft to maintain the predicted data services.

One advantage of the invention is that from being able to predict the locations for future data services request in terms of the volumes/types of data requests. By predicting this requirement in real time, with enough time to react, allows reactive action to avoid not being able to satisfy the data demand. In one embodiment this involves enough time to fly a control aerial vehicle (drone, airplane, etc) or move a mobile ground station into a location to create another node to support mesh links to one or more target aircraft.

It will be appreciated that the invention has the ability to respond dynamically to regional and commercial policies that may induce regional or temporal constraints on operation. Examples of this could be spectrum licenses for different regions (cross national borders, entering controlled spectral zones), predictive planning for temporary no-fly zones due to ground-based events or weather conditions. The invention will also support heterogeneous aircraft type with different profiles and capabilities.

In one embodiment there is provided the step of altering a flight path of the one or more other aircraft to maintain the data services on the target aircraft in response to said predicted data services requirement.

In one embodiment there is provided the steps of positioning an aircraft with a terrestrial link in the vicinity of an area of poor data services coverage and sharing the bandwidth from the terrestrial link to the target aircraft within the area of poor data services coverage via its aircraft-to-aircraft data link.

In one embodiment the positioning step of the aircraft is in response to the calculated predicted service requirement.

In one embodiment there is provided the step of generating a data usage profile and a data services availability map for each part of a flight path for said target aircraft.

In on embodiment there is provided the step of generating a metric for a level of service to be provisioned for a plurality of points in said flight path.

In one embodiment there is provided the step of adjusting the level of service required to the target aircraft depending on the availability of one or more datalinks form the one or more other aircraft.

In one embodiment there is provided the step of configuring a pattern of communication links between a ground station and said target aircraft.

In one embodiment there is provided the step of implementing a policy constraints to limit the use of available data links.

In one embodiment there is provided the step of categorising each aircraft as whether it can provide an aircraft-to-aircraft data link and calculating the data capacity of such a link.

In one embodiment there is provided the step of calculating the coverage of a connection and for how long the coverage can be maintained in an area.

In one embodiment there is provided the step of calculating the availability of aircraft with aircraft-to-aircraft communications and the available capacity for that aircraft which is in excess of the needs of that aircraft.

In another embodiment there is provided a network management system of providing service coverage for the provision of data services to a target aircraft comprising a module adapted for configuring one or more other aircraft in an area at a specific time such that the data services can be provided via a radio or communication link to the target aircraft via the one or more other aircraft.

In one embodiment there is provided a system and method for the placement of aerial vehicles in order to ensure maximal spatial coverage and data throughput on the basis of a combination of radio communication links between collaborating aircraft and collaborating ground stations.

In one embodiment there is provided a method for predicting future requirements utilising real time flight data, predicted flight paths, and predicted data usage.

In one embodiment there is provided a method of configuring the pattern of communication links between a ground station and a specific aircraft to optimise overall network performance and data service to that aircraft. In addition this method can take into account other optimisation requirements such as energy consumption, regional spectral restrictions, weather conditions, availability of aircraft.

In one embodiment there is provided a module for ensuring a fleet of aircraft (including drones) can be managed such that there is no service outage—particularly where ground links are not possible.

In one embodiment there is provided a module for generating a data usage profile and network availability map for each part of the flight plan on a per aircraft basis. Thus allowing a metric for the quality of the network service to the aircraft to be generated.

In one embodiment, upon development of a metric, if demand cannot be satisfied, then corrective action can be taken. This allows the system to build a reactive network of aircraft.

In one embodiment there is provided a module or means for identifying the optimal modifications of existing aircraft in the network or where to place a new aircraft at some point in the future. This is most relevant for the placement of a drone with data link capability.

In one embodiment there is provided method of providing service coverage for the provision of data services to a target aircraft comprising the steps of:
configuring one or more other aircraft in an area at a specific time such that the data services can be provided via a radio or communication link to the target aircraft; and
predicting a data services requirement in the area and configuring a pattern of communication links with the one or more other aircraft and the target aircraft to maintain the predicted data services.

In another embodiment network management system configured to provide service coverage for the provision of data services to a target aircraft comprising a module adapted for configuring one or more other aircraft in an area at a specific time such that the data services can be provided via a radio or communication link to the target aircraft via the one or more other aircraft; and a module configured to predict a data services requirement in an area and configuring a pattern of communication links with the one or more other aircraft and the target aircraft to maintain the predicted data services.

In one embodiment there is provided a module for sharing bandwidth from the one or more other aircraft, obtained from a terrestrial or satellite link, with said target aircraft via an aircraft to aircraft link.

In one embodiment there is provided a module for altering a flight path of the one or more other aircraft to maintain the data services on the target aircraft in response to said predicted data services requirement.

In one embodiment there is provided a module configured to position an aircraft with a terrestrial link in the vicinity of an area of poor data services coverage and sharing the bandwidth from the terrestrial link to the target aircraft within the area of poor data services coverage via its aircraft-to-aircraft data link.

There is also provided a computer program comprising program instructions for causing a computer program to carry out the above method which may be embodied on a record medium, carrier signal or read-only memory.

BRIEF DESCRIPTION OF THE DRAWINGS

The invention will be more clearly understood from the following description of an embodiment thereof, given by way of example only, with reference to the accompanying drawings, in which.

DETAILED DESCRIPTION OF THE DRAWINGS

This invention is in the context of a network of multiple aerial vehicles and ground stations through which an aerial vehicle will be able to receive data services through a radio link either directly from that aircraft to a ground station or via links to other aircraft from which a connection will be made to a ground station. The ground stations have high bandwidth links to the internet. In practice an aircraft can experience the situation where the data link to a ground station is not available to the aircraft, for example flying over remote locations, or insufficient for the desired usage and thus the users on the plane will have an impaired experience. This is likely to occur over inhospitable terrain such as oceans or mountains or in areas of high congestion.

This invention provides a method, via a network management unit (NMU) for ensuring that adequate service coverage is provided to the target aircraft by the proactive placement of one or more other aircraft into an area at a specific time such that the necessary data services can be provided via a radio link to the target aircraft. This method must make a prediction of where performance impairment may occur so as to provide time to manoeuvre an aircraft into position.

In the present invention, a gap in the network service coverage is a spatial region in which an aircraft will experience insufficient data services to cater for the needs of aircraft and its passengers. The data services available to an aircraft can be delivered by a combination of means: terrestrial datalinks; satellite datalinks; and datalinks to other aircraft who may have functioning datalinks to other sources. Based on the position of the aircraft with respect to the Earth, to the satellites and to other aircraft, there will be great variability in the availability of these services and the data rate available from each technique. In the present invention, each aircraft will at least have the capability of sharing a datalink between aircraft and that through those aircraft-to-aircraft links, access to either satellite or terrestrial datalinks can be shared.

To ensure full spatial coverage where existing datalinks are not available, the invention makes it possible to manoeuvre one or more aircraft so as to adjust the configuration of datalinks and thus enhance data services in a spatial region. This can require the adjustment of flight plans or plans for existing aircraft in the area or by ordering an additional aircraft to enter the relevant region. In a simple scenario, an aircraft with a terrestrial link can be placed in the vicinity of the region of poor coverage and provide a means of sharing the bandwidth from the terrestrial connection to aircraft within the region of poor coverage with via its aircraft-to-aircraft data link.

Figure 1:
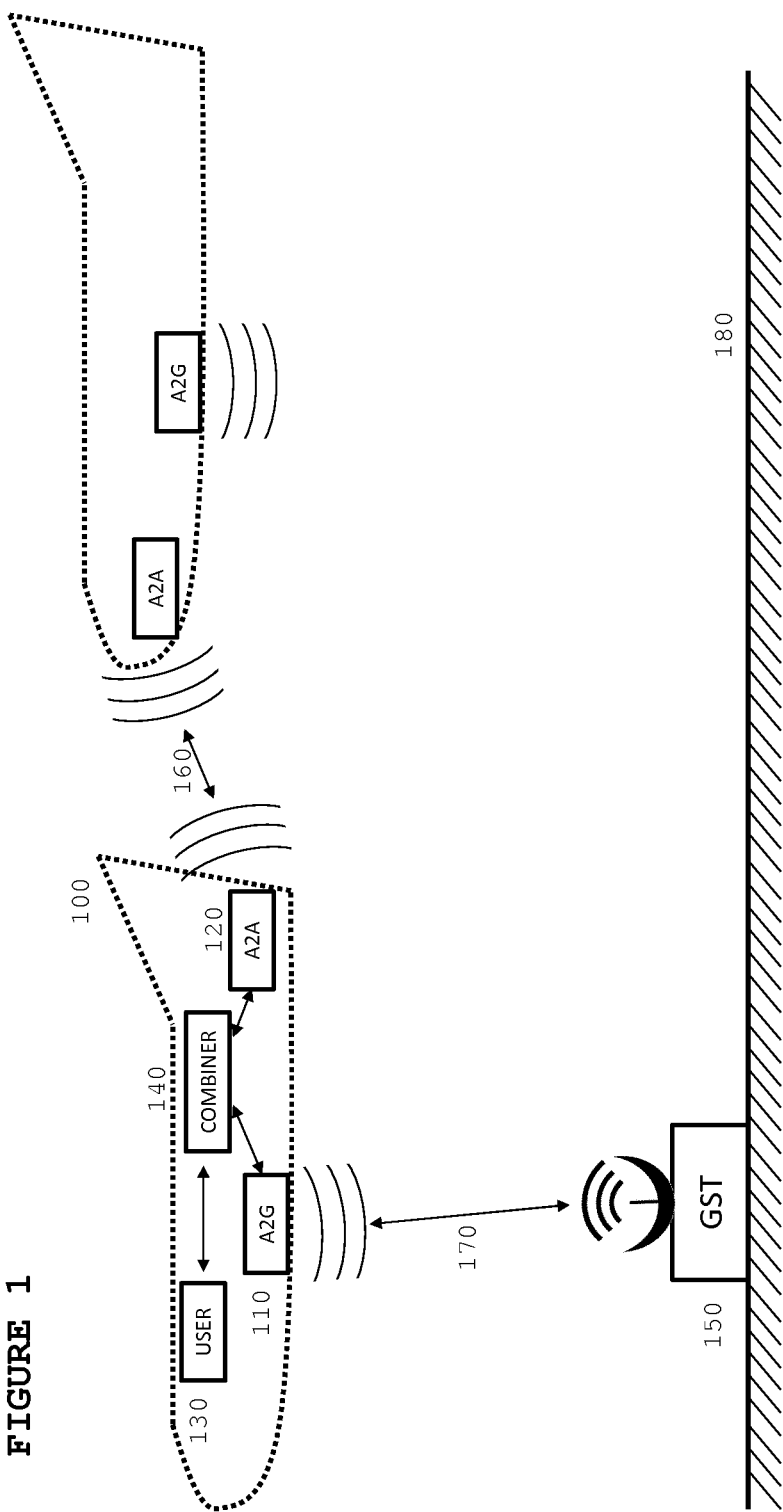
FIG. 1 illustrates the provision of data services to an aircraft (100) via an Air-to-Air link (A2A) (160) or via a link from air-to-ground (A2G) (170)

FIG. 1 illustrates the provision of data services to an aircraft (100) via an Air-to-Air link (A2A) (160) or via a link from air-to-ground (A2G) (170). These links are provided through a combination of transceivers (110,120, and 150) that are located on the ground (180) or in the aircraft. The data capacity from the available links is aggregated in a combiner (140) and presented to one or more users (130).

Figure 2:
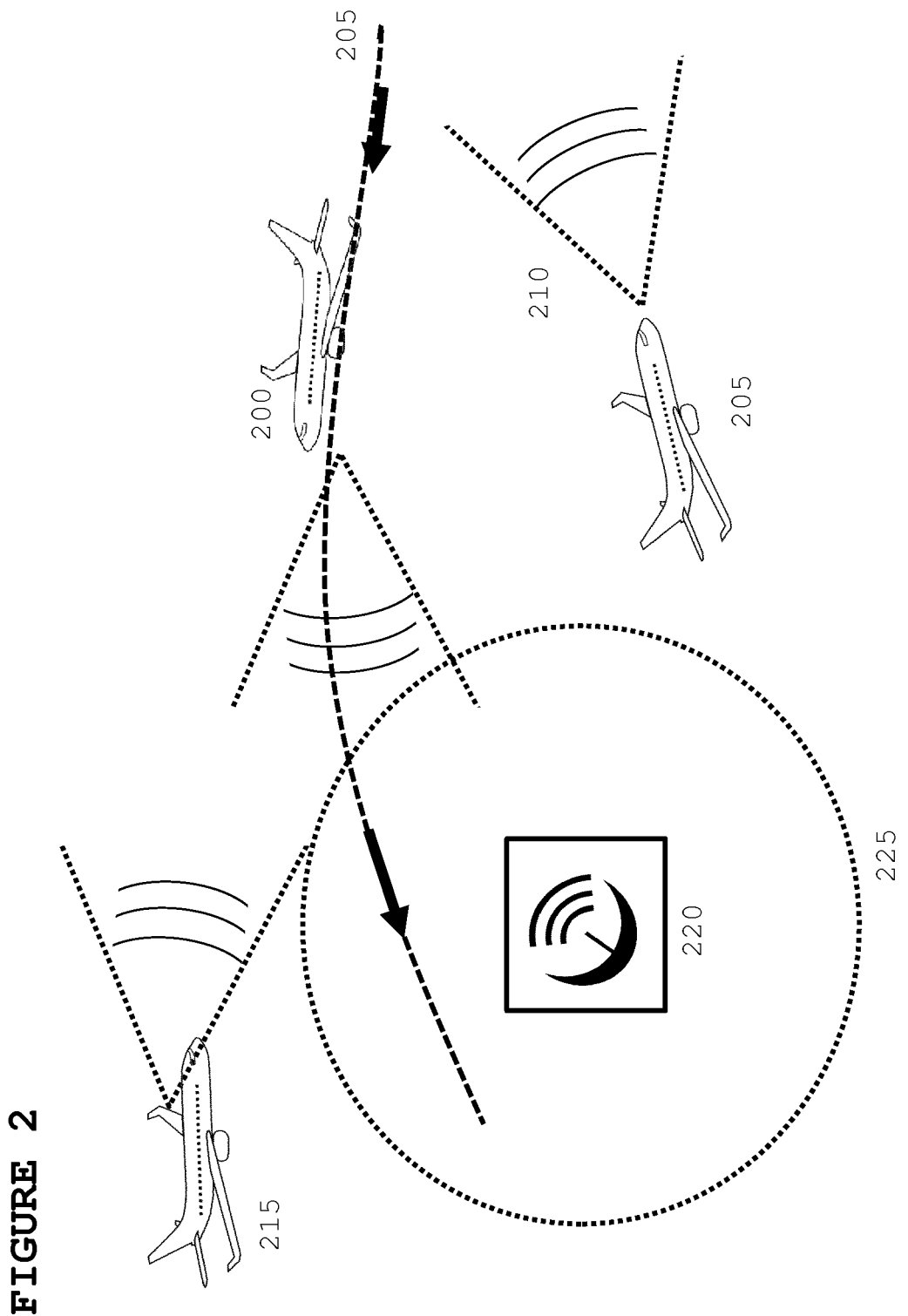
FIG. 2 illustrates the formation of the connectivity from an aircraft (200) requiring data service from a ground station (220) and other aircraft, according to one embodiment.

FIG. 2 illustrates the formation of the connectivity from an aircraft (200) requiring data service from the ground station (220) and other aircraft. The ground station has a limited range (225) in which it can provide good connectivity. In this embodiment, the aircraft are depicted with a limited field of view (210) in which connectivity with another aircraft is possible. In this figure, a nearby aircraft (205) is not aligned to provide connectivity whereas another aircraft (215) is. In addition, ground stations may not be in range and may be unable to provide coverage. As the aircraft flies along its flight-path (205), the relative locations of the aircraft to the other aircraft and to the ground stations will change and the availability of links will thus alter.

Figure 3:
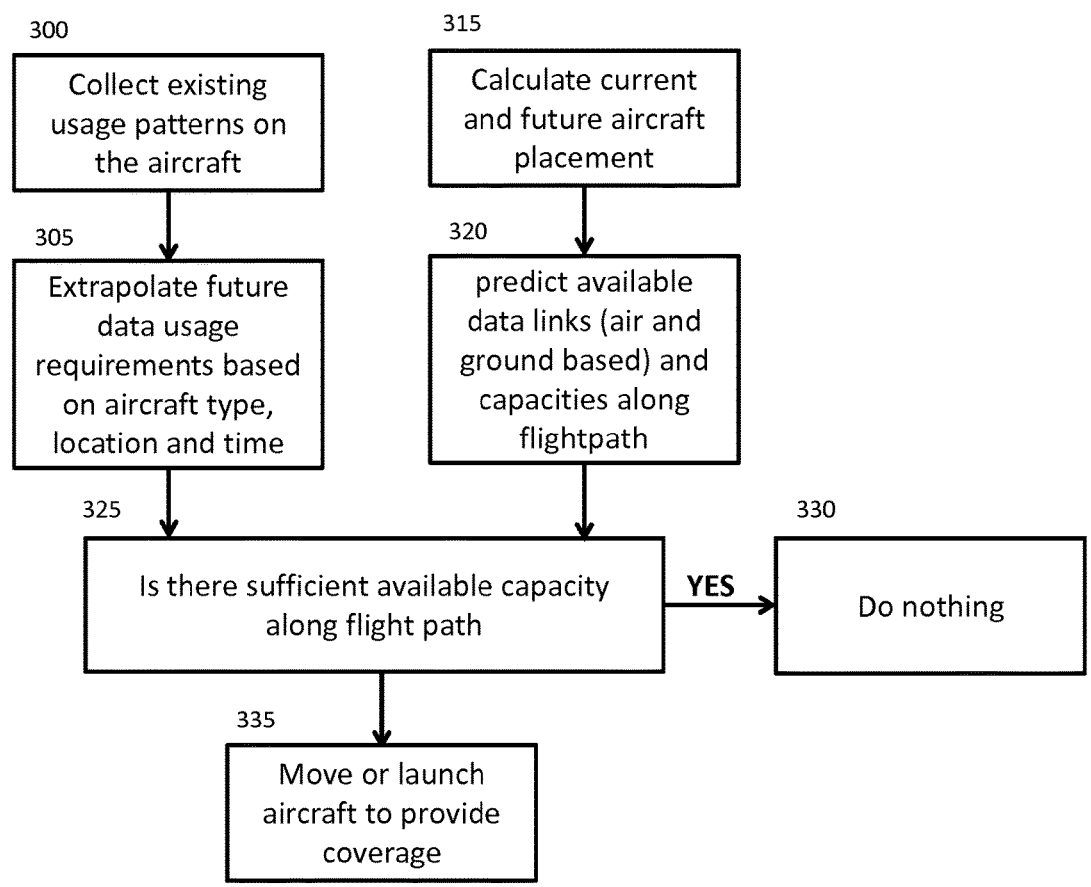
FIG. 3 illustrates a decision flow for a network management unit (NMU), according to one embodiment of the invention.

FIG. 3 illustrates a decision flow for a network management unit (NMU). The NMU prepares for each aircraft a data usage profile along its flight route (305). This estimated profile will be dependent on one or more factors, such as existing usage (300), the historical behaviour of passengers on that flight path, the aircraft type, time of day and other possible factors. Simultaneously the NMU must develop an estimate for the availability of data links along that flight path from other aircraft and ground stations, the capacity of these links, and any other operational constraints (320). The comparison (325) of the data usage requirements and the availability of capacity will either indicate no need for intervention (330) or that an aircraft needs to be moved, or perhaps added to the network, to provide the requirement coverage (335).

The network management unit (NMU) will take into account the following considerations in trying to pre-emptively predict the location and timing of such a gap. To do so, it will utilise a range of possible information sources which can include:

Flight plans: by using the published flight plans for all aircraft in the spatial region of interest, it will be possible to extrapolate forward in time the expected locations and heights of every aircraft.

Flight Locations: in addition to the published flight plans, the data will be complemented with realtime flight location date which will help verify compliance with the flight plans or detect deviations from those plans Aircraft Technology Profiles: information about the ability of each aircraft to provide an aircraft-to-aircraft linkage, the pointing angles from which these links can be made (e.g. pointing forward or pointing backwards), possible coverage areas, access conditions and operational constraints, and potential available capacity.

Data Usage Patterns: it will be possible to record the data usage pattern of different types of planes on specific routes (e.g. on a transatlantic Boeing 747 overnight flight). With this information, it will be possible to make predictive estimates of the data usage pattern of the passengers.

Weather conditions: storms and varying wind speeds can create variations in the timing and flight plans of flights. Knowledge of the weather conditions can help in predicting changes in the location and behaviour of the planes.

Business profiles: issues such as business relationships between aircraft, technical compatibility, prices can also be factored in.

This information will need to be combined with knowledge of the location of ground stations, the availability and data capacity of the different communication links available to an aircraft at each stage in its journey. To gather this full picture, the NMU can categorise each aircraft as whether it can provide an aircraft-to-aircraft link and what is the data capacity of such a link, what area of coverage can it provide a connection and for how long, the availability of aircraft with aircraft-to-aircraft communications and finally the available capacity for that plane which is in excess of the needs of that plane. In additional there may be operational or policy constraints that may limit the use of available data links—for example on the basis of cost, corporate policies, privacy and trust considerations.

Once the coverage map has been generated for each point in an aircraft's flight plan, a metric for the level of service being provided can be generated. This can be compared with the expected usage and if the level of available service is insufficient to cater for the demand, then the NMU can take corrective action.

Where corrective action is required, the NMU will assess whether acceptable adjustments in the existing flight plans of aircraft can be made to overcome this gap in available performance. Acceptable variations in an existing flight path will be based on a range of criteria such as cost, impact on primary purpose of the flight, etc.

Where this is not possible, the NMU can investigate the optimal location for an additional aircraft to be added to the existing network so as achieve the needed performance. This new aircraft may one that was previously unavailable or an aircraft flying for the primary purpose of maintaining network coverage. The location and movement of the additional aircraft will have an impact on not only the specific aircraft being provided coverage but also can assist a number of aircraft who may be depending on a lower performance link. As adjusting aircraft positions takes time, the NMU must provide sufficient time to achieve the placement.

This approach can be expanded to include operational issues—such as pricing structures, legal and business agreements between aircraft owned by different companies, privacy, prioritisation, and other regulatory issues. This would allow for the development of a resource availability model that goes beyond availability but also provide costs to different levels of availability.

Figure 4:
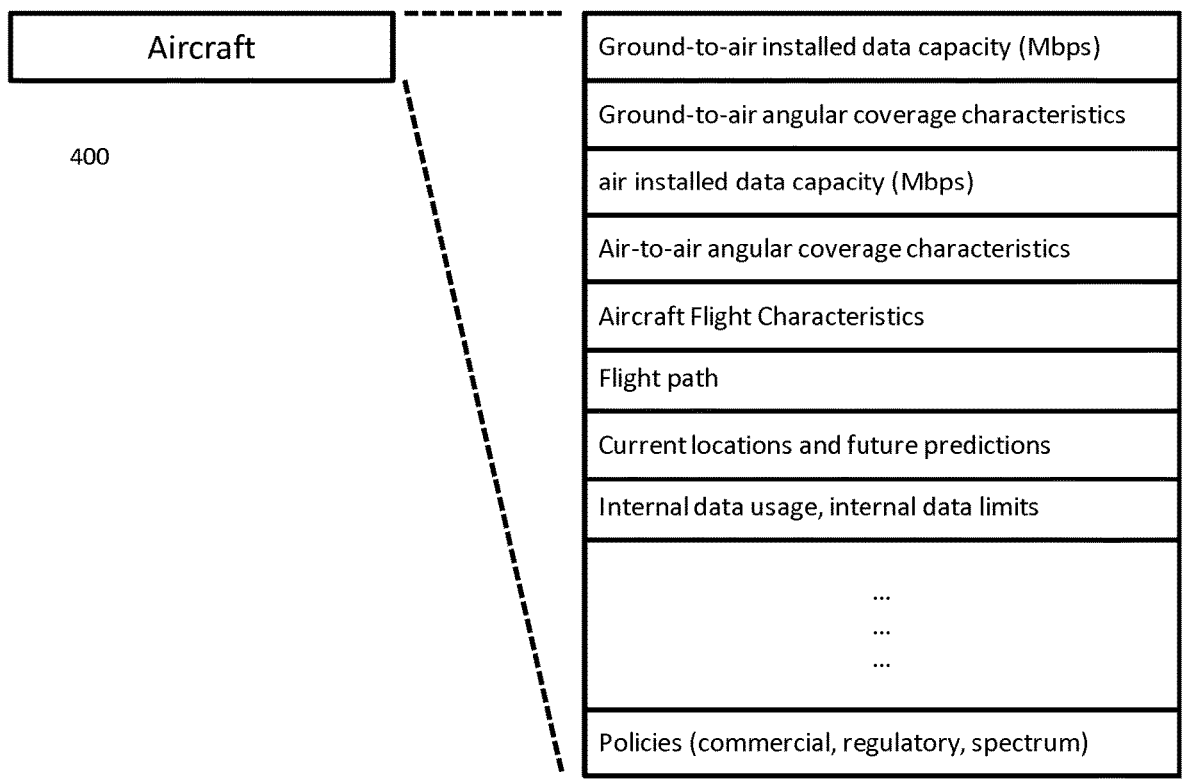
FIG. 4 illustrates an example profile of an aircraft flying in a particular area or region.

A database can be generated that contains the flight path and recent and current known locations of all aircraft equipped with a compatible ground-to-air and air-to-air communication system. Each aircraft will have a profile that provides information on the levels of functionality it can offer, such as available bandwidth, angles of coverage, available power, and any policies that may have operational impact—such as commercial agreements, legal agreements, access issues, regional spectrum-allocation policies. FIG. 4 illustrates an example profile of an aircraft flying in a particular area or region, indicated generally by the reference numeral (400) where two or more features can be used to profile an aircraft.

Using the data from the flight plans, aircraft location updates on direction and speed, the database will make a prediction of future locations for each aircraft.

This will have a level of uncertainty as weather changes, air-traffic-control mandate changes, or pilot decisions can impact future predictions.

Each aircraft will be profiled to determine the quantity of data throughput it will use. For example a cargo aircraft may be able to participate in the communications network but may have very little or no internal use of the network. Alternatively a large passenger aircraft would have a large personal use requirement but may have commercial agreement constraints on how much it may use. The usage expectations can also be generated from empirical data collated from previous flights for similar aircraft in different regions, times, and progress of flight. From the individual aircraft profile, expected performance and actually current performance, a spatial map will be generated of data usage requirements.

In the network, the network can consist of a number of nodes that are being carried by the aircraft. Each node can have none, one or more connections to the ground and similarly to the other aircraft. Each node in the network must have one connection available to a ground node or to another aircraft node. The availability of a connection is typically constrained by location and angular visibility of other nodes.

The available capacity on a new connection to a node is determined by the physical radio characteristics of the connection (bandwidth, power, distance). On air-to-air connections, the available capacity will also be constrained by the connections the other node has, and the internally sourced data usage that it may already have. Air-to-ground connections may also have performance limitations due to the ground-to-internet connection being shared between multiple aircraft links. The issue of bandwidth sharing will be a greater challenge where there are multiple chained aircraft-to-aircraft links.

Figure 5:
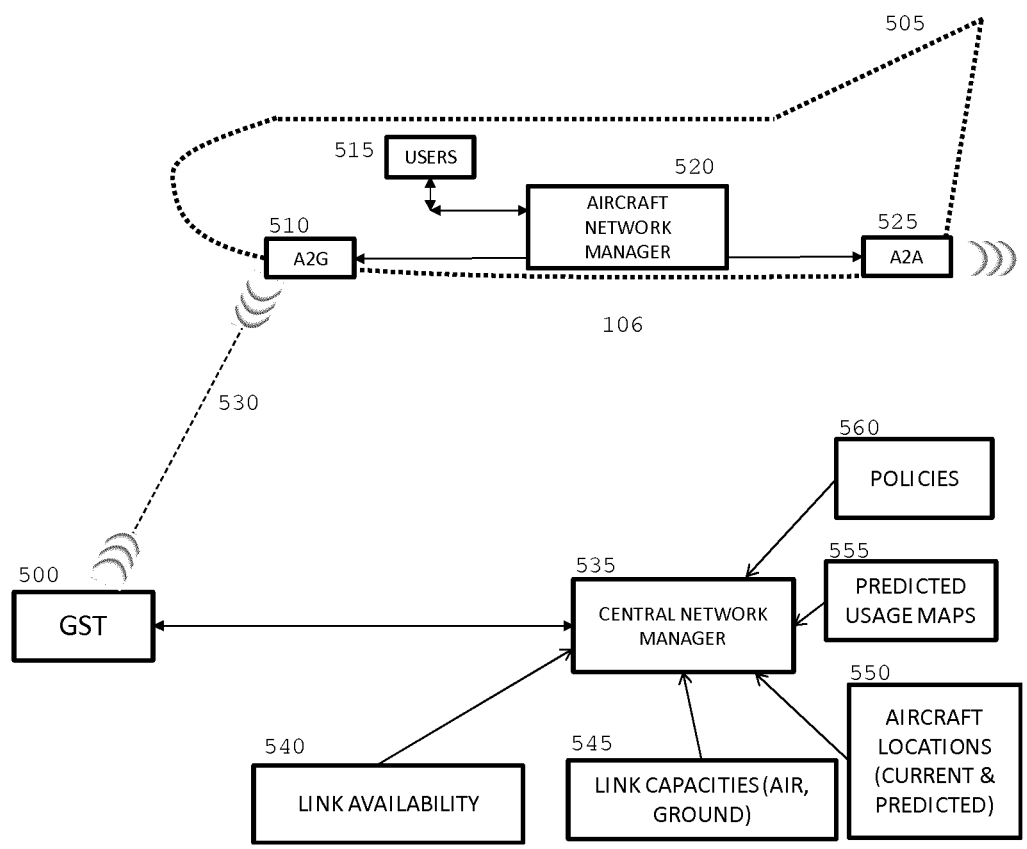
FIG. 5 illustrates a network management unit (NMU) communicating with a ground station and central data manager.

FIG. 5 illustrates a network management unit (NMU) communicating with a ground station (500) and central data manager (535). The ground station (500) can provide a terrestrial link (530) to one or more aircraft (505). Each aircraft (505) will have a network management unit (520) that will liaise with a centralised management unit (535). The purpose of this management function (520) is to ensure that each aircraft optimally picks between the available air-to-air (525) and air-to-ground (510) links such that a data service is provided to each aircraft with maximal performance from a network and individual aircraft perspective. The network management unit (520) will take into account that the each node, or aircraft, is in constant movement and the availability of nodes continually changes. The network management (520) unit monitors the bandwidth requirement from a plurality of users (515).

The centralised network manager (535) can take inputs such as Link availability (540); Link Capacity (545); Aircraft location (550); Predicted usage maps (555) and policies (560). It will also utilise the usage and future location map to identify potential regions of congestion and poor coverage. In these scenarios links may be re-arranged to disperse the traffic from congested routes to less congested paths, or to create new links to minimise coverage gaps. The network manager may order the on-board network controller to alter its connections to different air and ground nodes to maintain network. The network manager will also predict future locations of all aircraft and the future availability of connections. In this scenario it may pre-emptively order new connections in preparation for future use.

In response to the ground network controller, the aircraft network controller can initiate a search for new connections—a general search or for a specific node. Upon completion, it will respond to the ground controller on available connections. The situation may arise that a connection may be theoretically available but not discoverable by the aircraft.

The network management unit may set maximum data rates to each aircraft. This may result in throttling of available performance to on-board users. This throttling may be for an overall data-rate but may also be applied to specific traffic types, payment schemes, or other prioritisation methods. This is required to ensure that congested data links do not create regions of poor service even though links are available.

Figure 6:
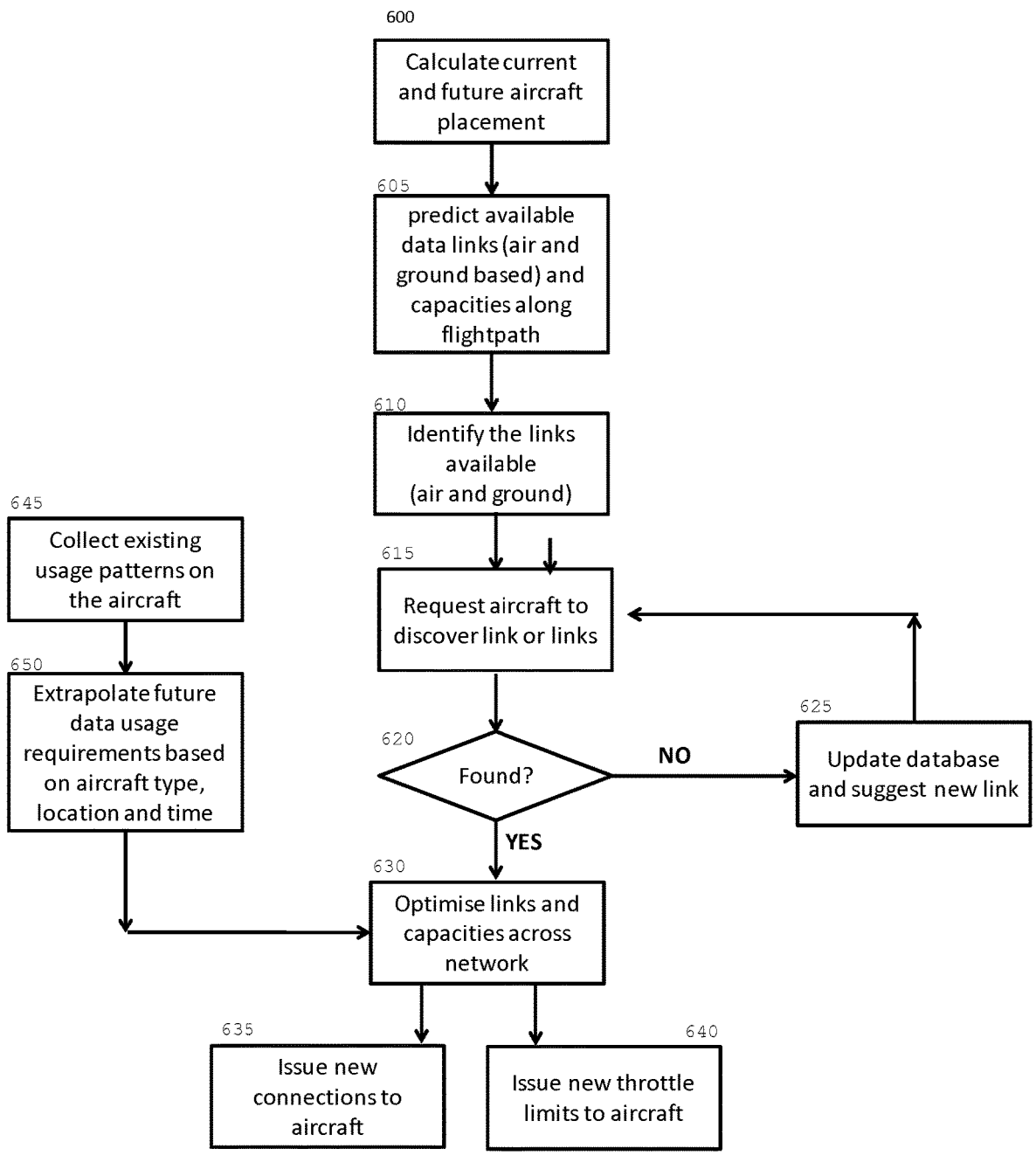
FIG. 6 illustrates a flowchart how a data link can be optimised for a node or aircraft travelling in a region.

FIG. 6 is an example flowchart for the central network manager (535) illustrating operation is as follows. In step 600 current and future aircraft placement within an area or mesh region is calculated. In step 605 a prediction of available data links is calculated. This can be done by using historical data usage records for a particular flight and also noting the passenger number size of that aircraft, it is possible to predict particular aircraft that will act a heavy demand sources (e.g. long distance twin aisle). This can be used as an input by the routing algorithm to the assignment of aircraft nodes. For example, that aircraft to a sub-mesh with a lower number of nodes or a sub mesh made up of lighter demand aircraft or a sub-mesh where the sub mesh's air-ground link offers the highest bandwidth. Thereby freeing up total bandwidth supply to meet the specific heavy demand node. Review historical data usage records based on geographic locality can inform the type of end consumer data demands. This can be used to predict key content that we likely to demanded repeatedly by multiple consumers. A routing algorithm can use this to temporarily cache the content on a specific aircraft node and also route this via air-air links to other aircraft node predicted to have the same content demand. Thereby only seeking to transport that content demand once from the air-ground link bandwidth which is a point of bottleneck. In step 610 data links available are identified. In step 615 the controller can request aircraft to discover available links in a particular region. In step 620 if no link is found then the database is updated and a new link suggested based on available data links in step 625. If a link is found then the link is optimised in step 630. In step 635 new connections can be issued to the aircraft depending on data requirement for that aircraft or alternatively throttle limits can be employed in 640 if no additional data links are available in the mesh region. In parallel each aircraft node can calculate at a local level the actual usage in step 645 and calculate projected future usage requirements in step 640. This information from steps 645 and 650 can be fed into step 640 to optimise the scheduling of the data links in real time.

The embodiments in the invention described with reference to the drawings comprise a computer apparatus and/or processes performed in a computer apparatus. However, the invention also extends to computer programs, particularly computer programs stored on or in a carrier adapted to bring the invention into practice. The program may be in the form of source code, object code, or a code intermediate source and object code, such as in partially compiled form or in any other form suitable for use in the implementation of the method according to the invention. The carrier may comprise a storage medium such as ROM, e.g. CD ROM, or magnetic recording medium, e.g. a memory stick or hard disk. The carrier may be an electrical or optical signal which may be transmitted via an electrical or an optical cable or by radio or other means.

In the specification the terms "comprise, comprises, comprised and comprising" or any variation thereof and the terms include, includes, included and including" or any variation thereof are considered to be totally interchangeable and they should all be afforded the widest possible interpretation and vice versa.

The invention is not limited to the embodiments hereinbefore described but may be varied in both construction and detail.

The invention claimed is:

1. A method of providing service coverage for the provision of data services to a target aircraft comprising:
    generating a data services availability map and an expected data usage profile aboard the target aircraft for each point in a flight plan of the target aircraft;
    generating a metric for a level of available data services for each point in the flight plan based on the data services availability map;
    comparing the metric with the expected data usage profile for each point in the flight plan; and
    when the level of available data services is insufficient, configuring a pattern of communication links with one or more other aircraft and the target aircraft to achieve the expected data usage profile.

2. The method of claim 1 further comprising:
    sharing bandwidth from the one or more other aircraft, obtained from a terrestrial or satellite link, with said target aircraft via an aircraft to aircraft link.

3. The method of claim 1, wherein configuring a pattern of communication links with one or more other aircraft and the target aircraft further comprises:
    altering a flight path of the one or more other aircraft to achieve the expected data usage profile.

4. The method of claim 1, wherein configuring a pattern of communication links with one or more other aircraft and the target aircraft comprises:
    positioning an aircraft with a terrestrial link in the vicinity of an area of poor data services coverage and sharing the bandwidth from the terrestrial link to the target aircraft within the area of poor data services coverage via its aircraft-to-aircraft data link.

5. The method of claim 1, further comprising:
    adjusting the level of service required to the target aircraft depending on the availability of one or more datalinks form the one or more other aircraft.

6. The method of claim 1, further comprising:
    configuring the pattern of communication links between a ground station and said target aircraft.

7. The method of claim 1, further comprising:
    implementing policy constraints to limit the use of available data links.

8. The method of claim 1, further comprising:
    categorizing each aircraft as whether it can provide an aircraft-to-aircraft data link and calculating the data capacity of such a link.

9. The method of claim 1, further comprising:
    calculating the coverage of a connection and for how long the coverage can be maintained in an area.

10. The method of claim 1, further comprising:
    calculating the availability of aircraft with aircraft-to-aircraft communications and the available capacity for that aircraft which is in excess of the needs of that aircraft.

11. A network management system configured to provide service coverage for the provision of data services to a target aircraft comprising:
    a module adapted for generating a data services availability map and an expected data usage profile aboard the target aircraft for each point in a flight plan of the target aircraft;
    a module adapted for generating a metric for a level of available data services for each point in the flight plan based on the data services availability map; and
    a module adapted for comparing the metric with the expected data usage profile for each point in the flight plan and, when the level of available data service is insufficient, configuring a pattern of communication links with one or more other aircraft and the target aircraft to achieve the expected data usage profile.

12. The system of claim 11, further comprising:
    a module for sharing bandwidth from the one or more other aircraft, obtained from a terrestrial or satellite link, with said target aircraft via an aircraft to aircraft link.

13. The system of claim 11, wherein the module adapted for configuring the pattern of communication links with one or more other aircraft and the target aircraft further comprises:
    a module for altering a flight path of the one or more other aircraft to achieve the expected data usage profile.

14. The system of claim 11, wherein the module adapted for configuring the pattern of communication links with one or more other aircraft and the target aircraft further comprises:
    a module configured to position an aircraft with a terrestrial link in the vicinity of an area of poor data services coverage and to share the bandwidth from the terrestrial link to the target aircraft within the area of poor data services coverage via its aircraft-to-aircraft data link.

15. A non-transitory computer-readable storage medium having program instructions for providing data services to a target aircraft, including instructions for:
    generating a data services availability map and an expected data usage profile aboard the target aircraft for each point in a flight plan of the target aircraft;

generating a metric for a level of available data services for each point in the flight plan based on the data services availability map;

comparing the metric with the expected data usage profile for each point in the flight plan; and when the level of available data services is insufficient, configuring a pattern of communication links with one or more other aircraft and the target aircraft to achieve the expected data usage profile.

* * * * *